United States Patent
Dahlman et al.

(10) Patent No.: US 8,820,615 B2
(45) Date of Patent: Sep. 2, 2014

(54) METHOD FOR MANUFACTURING A STEEL COMPONENT, A WELD SEAM, A WELDED STEEL COMPONENT, AND A BEARING COMPONENT

(75) Inventors: Patrik Dahlman, Partille (SE); John Van De Sanden, Nieuwegein (NL)

(73) Assignee: Aktiebolaget SKF, Gothenburg (SE)

( * ) Notice: Subject to any disclaimer, the term of this patent is extended or adjusted under 35 U.S.C. 154(b) by 425 days.

(21) Appl. No.: 12/997,931

(22) PCT Filed: Jul. 10, 2009

(86) PCT No.: PCT/SE2009/000365
§ 371 (c)(1),
(2), (4) Date: Mar. 15, 2011

(87) PCT Pub. No.: WO2010/005362
PCT Pub. Date: Jan. 14, 2010

(65) Prior Publication Data
US 2011/0158572 A1  Jun. 30, 2011

(30) Foreign Application Priority Data

Jul. 11, 2008  (SE) .................................. 08016735

(51) Int. Cl.
*B23K 31/02*  (2006.01)

(52) U.S. Cl.
USPC .... 228/200; 228/227; 228/233.2; 228/262.41

(58) Field of Classification Search
None
See application file for complete search history.

(56) References Cited

U.S. PATENT DOCUMENTS

| | | | | |
|---|---|---|---|---|
| 3,482,296 A | * | 12/1969 | Sampatacos | 29/898.066 |
| 3,506,251 A | * | 4/1970 | Sampatacos | 266/133 |
| 3,522,644 A | * | 8/1970 | Cavagnero | 29/898.066 |
| 3,531,848 A | * | 10/1970 | Gripshover et al. | 419/5 |
| 3,933,534 A | * | 1/1976 | Ettenreich et al. | 148/575 |
| 4,062,705 A | | 12/1977 | Gondo et al. | |
| 4,314,862 A | * | 2/1982 | Sudo et al. | 148/522 |
| 4,397,698 A | * | 8/1983 | Davenport et al. | 148/624 |
| 4,437,902 A | * | 3/1984 | Pickens et al. | 148/521 |

(Continued)

FOREIGN PATENT DOCUMENTS

| | | |
|---|---|---|
| CN | 1646716 A | 7/2005 |
| JP | 53-119236 A * | 10/1978 |

(Continued)

OTHER PUBLICATIONS

Machine translation of CN-1646716A (no date available).*

*Primary Examiner* — Kiley Stoner
(74) *Attorney, Agent, or Firm* — Bryan Peckjian; SKF USA Inc. Patent Department

(57) ABSTRACT

The invention concerns a method for manufacturing a steel component (6, 11) comprising a first steel part (7) and a second steel part (8), the first (7) and second (8) steel part having a carbon content up to 1.5 weight percent, The method is comprising: Heating (1), at least partly, the first steel part (7), and at least partly, the second steel part (8), to above the alpha/gamma transformation temperature, and joining (2) the first steel part (7) and the second steel part (8) by welding, the welding taking place at a temperature above the alpha/gamma transformation temperature, and cooling (3) such that hardening effects are avoided. The invention further concerns weld seams (9), welded steel components (6, 11), and bearing components (11, 15, 20, 22, 26, 27, 31).

6 Claims, 5 Drawing Sheets

(56) References Cited

U.S. PATENT DOCUMENTS

| | | | |
|---|---|---|---|
| 4,501,626 A * | 2/1985 | Sudo et al. | 148/320 |
| 4,521,258 A * | 6/1985 | Tamehiro et al. | 148/505 |
| 4,614,551 A * | 9/1986 | Furukawa et al. | 148/602 |
| 4,830,686 A * | 5/1989 | Hashiguchi et al. | 148/320 |
| 5,377,959 A * | 1/1995 | Besch et al. | 266/167 |
| 5,389,164 A * | 2/1995 | Yoshie et al. | 148/547 |
| 6,066,212 A * | 5/2000 | Koo et al. | 148/336 |
| 6,159,312 A * | 12/2000 | Koo et al. | 148/336 |
| 6,212,891 B1 * | 4/2001 | Minta et al. | 62/50.7 |
| 6,264,770 B1 * | 7/2001 | Hong et al. | 148/663 |
| 6,537,397 B1 * | 3/2003 | Sugawara | 148/622 |
| 7,402,215 B2 | 7/2008 | Ohashi et al. | |
| 2003/0047256 A1 * | 3/2003 | Kami et al. | 148/603 |
| 2003/0129444 A1 * | 7/2003 | Matsuoka et al. | 428/659 |
| 2003/0188811 A1 * | 10/2003 | Kami et al. | 148/603 |
| 2003/0201038 A1 * | 10/2003 | Matsuoka et al. | 148/602 |
| 2003/0201039 A1 * | 10/2003 | Mochida et al. | 148/651 |
| 2004/0050445 A1 * | 3/2004 | Ohgami et al. | 138/177 |
| 2004/0108024 A1 * | 6/2004 | Matsuoka et al. | 148/602 |
| 2004/0238084 A1 * | 12/2004 | Mega et al. | 148/654 |
| 2006/0154101 A1 | 7/2006 | Ohashi et al. | |
| 2006/0243353 A1 | 11/2006 | Milam | |
| 2007/0007297 A1 * | 1/2007 | Li | 220/782 |
| 2007/0269678 A1 | 11/2007 | Ono et al. | |
| 2008/0179377 A1 * | 7/2008 | Ozaki et al. | 228/3.1 |

FOREIGN PATENT DOCUMENTS

| | | | |
|---|---|---|---|
| JP | 11-106825 A * | 4/1999 | |
| JP | 11-114624 A * | 4/1999 | |
| JP | 11-124631 A * | 5/1999 | |
| JP | 2008-214753 A * | 9/2008 | |
| JP | 2008-266785 A * | 11/2008 | |

* cited by examiner

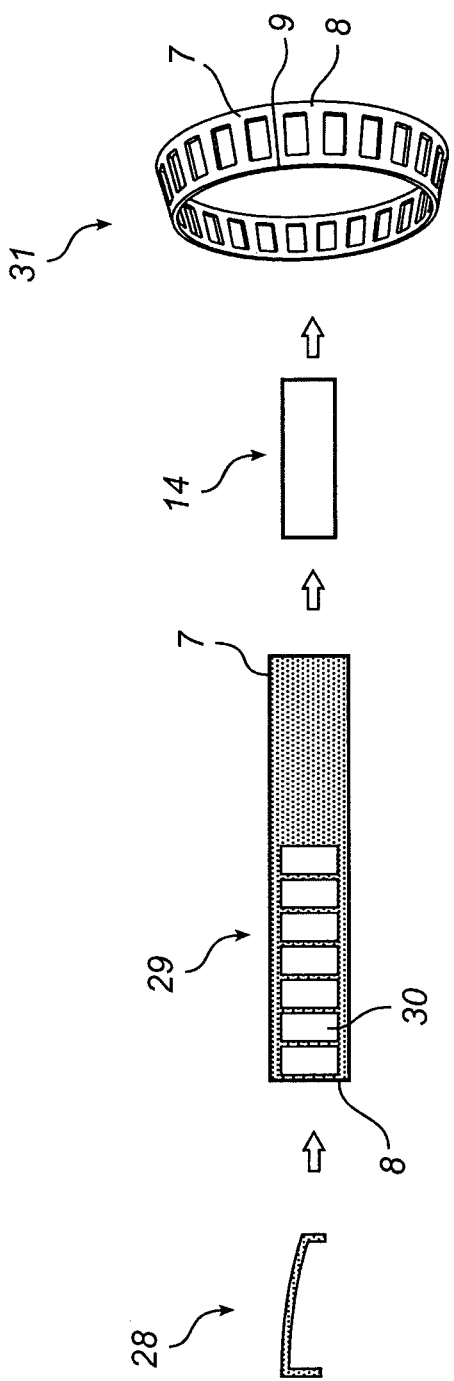

METHOD FOR MANUFACTURING A STEEL COMPONENT, A WELD SEAM, A WELDED STEEL COMPONENT, AND A BEARING COMPONENT

A method for manufacturing a steel component, a weld seam, a welded steel component, and a bearing component.

FIELD OF THE INVENTION

According to a first aspect, the invention concerns a method for manufacturing a steel component.

According to a second aspect, the invention concerns a first weld seam.

According to a third aspect, the invention concerns a first welded steel component.

According to a fourth aspect, the invention concerns a second weld seam.

According to a fifth aspect, the invention concerns a second welded steel component.

According to a sixth aspect, the invention concerns a third welded steel component.

According to a seventh aspect, the invention concerns a method for manufacturing a bearing component.

According to an eighth aspect, the invention concerns a bearing component comprising a weld seam.

BACKGROUND

Welding may be an effective method to join steel components. However, with a rising carbon content of the steel, the more problematic the welding becomes. Known problems associated with rising carbon content may for instance be severe phase transformations that result in brittle welds that easily crack, either during welding, almost directly after welding or when subjected to a load. This is due to the very large grains with brittle plate martensite that, are formed in the fusion zone and the heat affected zone during welding.

SUMMARY OF INVENTION

An object of the invention is to provide a method for welding a steel component that has good strength, good fatigue and load capacity, and that is simple and cheap to produce.

The present invention presents a number of aspects, where the method according to the first aspect results in outputs that are the base of the other aspects.

According to the first aspect of the invention, the object is achieved by a method for manufacturing a steel component comprising a first steel part and a second steel part, and where the first and second steel part have a carbon content, up to 1.5 weight percent (wt %). According to the method, the first steel part and the second steel part are, at least partly, heated to above the alpha/gamma transformation temperature. In a subsequent step, the first steel part and the second steel part are joined by welding, and the welding takes place at a temperature above the alpha/gamma transformation temperature. In a subsequent step cooling is applied such that hardening effects are avoided. This leads to a first weld seam according to the second aspect of the invention.

By welding at temperatures above the alpha to gamma transformation temperature (austenitic condition) and solidification of the weld and further cooling performed in a controlled way, the phase transformations may be controlled, which prevent the forming of hard and brittle phases. Heating the steel, at least the parts and portions that are to be joined to each other, to a temperature just above the phase transformation from alpha iron (ferrite+carbides in case of 100Cr6) to gamma iron (austenite) at approximately 750 to 850° C. will result in gradual dissolving of carbides and in relation to time and temperature, grain growth will occur when all carbides are dissolved. If the welding is done at the mentioned temperature, with all material in the welding zone in the austenitic condition, a vast majority, or in some cases, all of the carbides left will dissolve. The liquid fusion zone will have all carbon available in full solution. Full solution of all carbon in the liquid fusion zone will lead to a very high risk of cracking if the liquid weld metal, and adjacent heat affected zone, is solidified and cooled down without proper control. This is accomplished by the present invention, which results in a weld with less risk of cracking compared to what is known in the prior art.

Solidification and cooling of the fusion zone, the heat affected zone and the remaining steel from the welding temperature needs to be under control. In principle, the cooling rate should be such that no phase transformation to any hardening phase (martensite or bainite) should occur. If the cooling is well controlled, fully or partly pearlitic structures are formed in the fusion zone (the weld) as well as in the heat affected zone, and remaining parts of the welded components being heated above the alpha/gamma transformation temperature.

In an embodiment, little grain boundary carbide of limited grain size is formed in the fusion zone (the weld). The amount of grain boundary carbide depends on the total carbon content of the steel in combination with the cooling rate.

The final microstructure after the welding and controlled cooling should be a fully or partly pearlitic structure, and in an embodiment with minor amounts of, non-continuous, grain boundary carbide and acceptable grain size. The total amount of carbon available in the steel dominates the development of pearlite, carbide and ferrite upon cooling at controlled rates. This results in a weld with less risk of cracking compared to what is known in the prior art.

Lower carbon steels will have pearlite plus ferrite or full pearlite in the microstructure after a controlled cooling. Lower carbon steels with a carbon content of approximately 0.7 wt % will form a fully pearlitic microstructure, and if the carbon content is below about 0.7 wt %, pearlite with ferrite will be formed after controlled cooling from the welding process. The amount of ferrite increases with lower carbon content.

The controlled cooling after welding has the goal to: Avoid non desired phase transformation e.g. hardening, avoid development of internal stresses in the welds and the HAZ, forming of a uniform microstructure in the welded component ready for post weld heat treatments e.g. spherodized annealing/hardening etc., make the post weld heat treated component to be ready for machining or other process to give. the component the "soft machined" shape and dimensions, hardening of the shaped component to required microstructural properties.

The controlled cooling is related to a number of factors, e.g. the Continuous Cooling Transformation (CCT) diagrams for the steels welded. For instance, in an embodiment, the transformation of the steel to pearlite for a 1% carbon steel starts around 670 degrees when the cooling continues through the pearlite area of the CCT diagram full pearlitic structure with some amount of grain boundary carbide will be formed. The time temperature/cycles are depending on the shape and dimensions of the welded components. The transformation during controlled cooling will be determined for the cross sections of the components. These can vary from natural cooling in protective atmospheres until the complete component has transformed. When for example the section of the component is too large, the core of the steel will remain too hot to transform and excessive grain boundary carbide will be formed. In such case, an increased cooling rate can be applied to the section of the component after the surface region of the component has been transformed into pearlite.

For example, in an embodiment, welding may be performed in a protective atmosphere at 860 degrees, the temperature in the weld pool is above 1600 degrees (molten steel), the part remains in the protective atmosphere and is cooled until the complete part (or pre heated area) and welded regions are cooled to 860 degrees This can take several minutes. As from 860 degrees the part can be cooled to the temperatures indicated on the CCT diagram. Further cooling cycle is determined by the factors indicated above. In an embodiment, the components are transferred to a furnace and cooled down in the furnace under a protective atmosphere to form a pearlitic structure.

In an embodiment, the method further comprises the step of soft annealing. By adding this step, a second weld seam according to the fourth aspect of the invention is provided, where the weld seam will comprise ferrite and carbides. It also facilitates further processing, e.g. machining or deformation of the welded steel component. This results in a weld seam with less risk of cracking compared to what is known in the prior art.

In an embodiment, the method further comprises the step of hardening the steel component. By this step it is possible to give the welded steel component the properties that are wanted to fulfill the required function(s). This may for instance be performed by martensite or bainite through hardening. Also surface hardening, such as induction hardening, laser hardening etc. may be applied.

In an embodiment, the heating, welding or cooling may be performed in a protective atmosphere.

In an embodiment, the welding is performed by using a power beam welding process, e.g. laser welding or electron beam welding.

In an embodiment, the welding is performed by using an arc welding process.

In an embodiment, the welding is performed by using a hybrid welding process, e.g. a combination of power beam with arc welding. An example of such process is e.g. laser welding plus GMAW (MIG).

In an embodiment, a suited filler material may be used during the welding by one of the many known techniques to add the filler material to the weld pool.

According to the second aspect of the invention, a first weld seam is provided that comprises a steel with a carbon content up to 1.5 weight percent, and where the first weld seam has a partly pearlitic microstructure.

The first weld seam is the result of the method according to the first aspect, more specifically after the heating, joining and controlled cooling. This will lead to a weld seam with less risk of cracking compared to what is known in the prior art.

In an embodiment, the first weld seam has a microstructure of at least 50%, 60%, 70%, 80%, 90%, 91%, 92%, 93%, 94%, 95%, 96%, 97%, 98%, or 99% of pearlite.

In an embodiment, the first weld seam further comprises grain boundary carbides in the range of 2 to 4 volume percent (vol %). In an embodiment, the first weld seam has grain boundary carbides in the range of 2.50 to 3.75 vol %.

In an embodiment, the first weld seam has grain boundary carbides in the range of 2.0 to 3.9 vol %, 2.1 to 3.8 vol %, 2.2 to 3.7 vol %, 2.3 to 3.6 vol %, 2.4 to 3.5 vol %, 2.5 to 3.4 vol %, 2.6 to 3.3 vol %, 2.7 to 3.2 vol %, 2.8 to 3.1 vol %, or 2.9 to 3.0 vol %.

According to the third aspect of the invention, a first welded steel component is provided that comprises a first steel part and a second steel part and also the first weld seam according to the second aspect of the invention. The first weld seam joins the first steel part and the second steel part. This will lead to a welded steel component with less risk of cracking compared to what is known in the prior art.

In an embodiment, the first steel part and the second steel part are made of the same steel.

In an embodiment, the first steel part and the second steel part are made of different steels. The advantage of this is that is possible to customize a resulting welded steel component by combining different steels with different properties concerning e.g. load capacity, durability, cost, or workability.

In an embodiment, the first steel part and the second steel part are parts of the same steel component prior to welding.

In an embodiment, the first steel part and the second steel part are parts of different steel components prior to welding.

In an embodiment, the first welded steel component comprises a plurality of weld seams according to the second aspect of the invention.

According to the fourth aspect of the invention, a second weld seam is provided that comprises a steel with a carbon content up to 1.5 weight percent, and where the weld seam has a ferritic microstructure and carbides having an average size of 0.2 to 3 micrometer. The second weld seam is the result of the method according to the first aspect, more specifically after the heating, joining, cooling, and soft annealing. This will lead to a weld seam with less risk of cracking compared to what is known in the prior art.

In an embodiment, the carbides are spherical carbides or alloy carbides.

In an embodiment, the content of carbides may be up to 15 volume percent (vol %).

According to the fifth aspect of the invention, a second welded steel component is provided that comprises a first steel part and a second steel part, and also the weld seam according to the fourth aspect of the invention. The weld seam is joining the first steel part and the second steel part. This will lead to a welded steel component with less risk of cracking compared to what is known in the prior art.

In an embodiment, the first steel part and the second steel part are made of the same steel.

In an embodiment, the first steel part and the second steel part are made of different steels. The advantage of this is that is possible to customize a resulting welded steel component by combining different steels with different properties concerning e.g. load capacity, durability, cost, or workability. Furthermore it is also possible to apply different suitable heat treatments of the different steels prior to welding.

In an embodiment, the first steel part and the second steel part are parts of the same steel component prior to welding.

In an embodiment, the first steel part and the second steel part are parts of different steel components prior to welding.

In an embodiment, the welded steel component comprises a plurality of weld seams according to the fourth aspect of the invention.

According to the sixth aspect of the invention, a third welded steel component is provided that comprises a heat affected zone, an unaffected zone that is not influenced by welding, and a weld seam. Furthermore, at least one of the weld seam and the heat affected zone has essentially an identical microstructure as the unaffected zone. Thus is the microstructure of at least one of the weld seam and the heat affected zone the same, or very similar, to the microstructure of the unaffected zone. Very small differences or variations may be identified and tolerated. Such very small differences or variations may for instance regard carbon content, content of carbides, distribution of carbides, size of carbides etc. Also minor differences in microstructures such as grainsize, materials fiber flow etc. may be observed by advanced investigation techniques such as microscopy or X-ray analysis by the man skilled in the art. This is a result of the method according to the first aspect of the invention. An advantage of this is that the welded steel component will present good strength, good fatigue and load capacity, and that is simple and cheap to produce. The inventive method also leads to a welded steel component having a good workability. Furthermore, the inventive method leads to a welded steel component having improved hardness, dimensional stability, wear resistance and rolling contact fatigues resistance. These advantages are especially important for rolling bearing and sliding bearing applications since they are subjected to very tough and complex running operations, and are for instance subjected to numerous forces simultaneously, e.g. tensile, compressive, friction etc. as a result of e.g. rolling and sliding contacts. Due to the fact that bearing applications must be able to handle and absorb so many different loads, forces, stresses, heat, cold etc., the requirements and specifications of a weld seam of a welded bearing component must be very hard.

According to the seventh aspect of the invention, a method for manufacturing a bearing component according to the first aspect is provided.

According to the eighth aspect of the invention, a bearing component comprising the weld seam according to the second or fourth aspect of the invention is provided.

In an embodiments the bearing component is for a rolling or sliding bearing.

In an embodiment, the bearing component is anyone of an inner ring, an outer ring, a hub, a hub bearing unit, a wheel hub, a bearing unit, a rolling element, or a cage.

In an embodiment any of the inner ring or the outer ring is a flanged ring.

In an embodiment, any of the hub, the hub bearing unit, or the wheel hub is flanged.

In an embodiment, the flange is joined to any of the inner ring, the outer ring, the hub, the hub bearing unit, or the wheel hub, by welding according to any of the first or seventh aspect of the invention.

In an embodiment, the rolling bearing comprising the bearing component is any of a ball bearing, a roller bearing, a cylindrical roller bearing, a spherical roller bearing, a toroidal roller bearing, a taper roller bearing, a conical roller bearing, a needle roller bearing, a thrust bearing, a bearing unit, a wheel bearing, a wheel hub bearing, a pinion bearing, or a flanged bearing.

In an embodiment, the bearing component is a screw or a nut for a ball screw or a roller screw.

In an embodiment, the carbon contents of any of the first steel part, the second steel part, the steel component, or the weld, is in the range of 0.1 to 1.5 wt %, 0.2 to 1.5 wt %, 0.3 to 1.5 wt %, 0.4 to 1.5 wt %, 0.5 to 1.5 wt %, 0.6 to 1.5 wt %, 0.7 to 1.5 wt %, 0.8 to 1.5 wt %, 0.9 to 1.5 wt %, 1.0 to 1.5 wt %, 1.1 to 1.5 wt %, 1.2 to 1.5 wt %, 1.3 to 1.5 wt %, or 1.4 to 1.5 wt %.

In an embodiment, the carbon contents of any of the first steel part, the second steel part, the steel component, or the weld, is in the range of 0.6 to 1.1 wt %, 0.7 to 1.1 wt %, 0.8 to 1.1 wt %, 0.9 to 1.1 wt %, or 1.0 to 1.1 wt %.

In an embodiment, the weld seam is oriented in a direction such that one composant of the weld seam is in an axial direction of the bearing.

In an embodiment, the weld seam is oriented in a direction such that it is substantially perpendicular to the rolling or sliding direction of the bearing.

All features and embodiments of any of the aspects of the invention are applicable to all features and embodiments of the other aspects of the invention and vice versa.

BRIEF DESCRIPTION OF DRAWINGS

FIG. 9: A schematic view of a method for manufacturing a cage according to an embodiment of the invention.

DETAILED DESCRIPTION OF PREFERRED EMBODIMENTS

Figure 1:
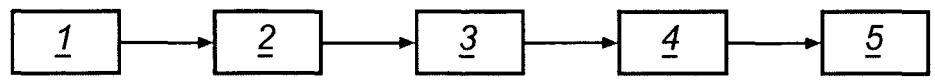
FIG. 1: A flowchart of a method for manufacturing a steel component according to an embodiment of the invention.

In FIG. 1, a flowchart for a method for manufacturing a steel component according to an embodiment of the invention, is shown. The steel component 6 comprises a first steel part 7 and a second steel part 8, and the first and second steel part have a carbon content up to 1.5 weight percent (wt %). According to a first step 1 of the method, the first steel part 7 and the second steel part 8 are, at least partly, heated to above the alpha/gamma transformation temperature. In a subsequent step 2, the first steel part 7 and the second steel part 8 are joined by welding, and the welding takes place at a temperature above the alpha/gamma transformation temperature. In another subsequent step 3, cooling is applied such that hardening effects are avoided. After the step of cooling 3 it may be wanted to process the steel component 6 further by applying a step of soft annealing 4. This will facilitate additional processing (not illustrated), e.g. machining or deformation of the steel component 6. In another subsequent step of the method, a hardening process 5 is applied in order to assign wanted properties to the welded steel component 6.

Figure 2:
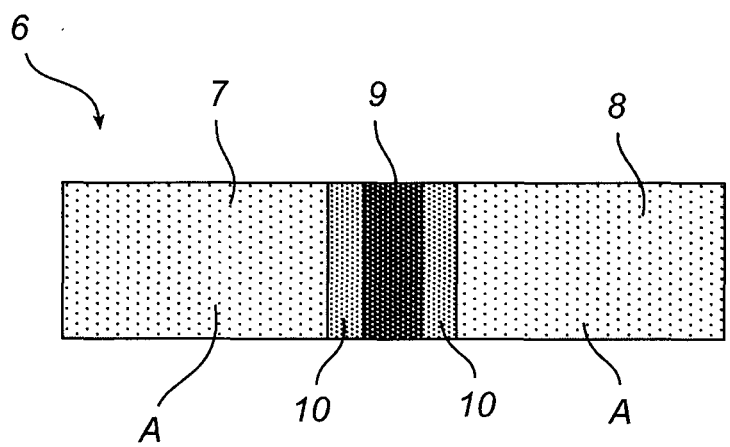
FIG. 2: A schematic view of a weld seam according to an embodiment of the invention.

In FIG. 2, a schematic view of a weld seam according to an embodiment of the invention, is shown. The first steel part 7 and the second steel part 8 of the steel component 6 are joined by the weld seam 9. In the figure, the weld seam is represented schematically in a rather rectangular profile for reasons of simplicity. However, it should be understood that the weld seam 9 may appear in other different profiles, for instance in a more triangular profile. A heat affected zone 10 is present adjacent the weld seam 9, and an unaffected zone A is adjacent the heat affected zone 10. In this embodiment, the first 7 and second 8 steel parts are made of the same steel and have an identical microstructure. Furthermore in this embodiment, the steel component 6 is seen after the heating 1, welding 2 and cooling 3 according to method of the present invention, but prior to any further processing steps, such as soft annealing 4. Consequently, the heat affected zone 10 has a somewhat different microstructure compared to the unaffected zone A of the first 7 and second 8 steel parts. The weld seam 9 has another microstructure than both the heat affected zone 10 and the unaffected zone A of the first 7 and second 8 steel parts.

Figure 3:
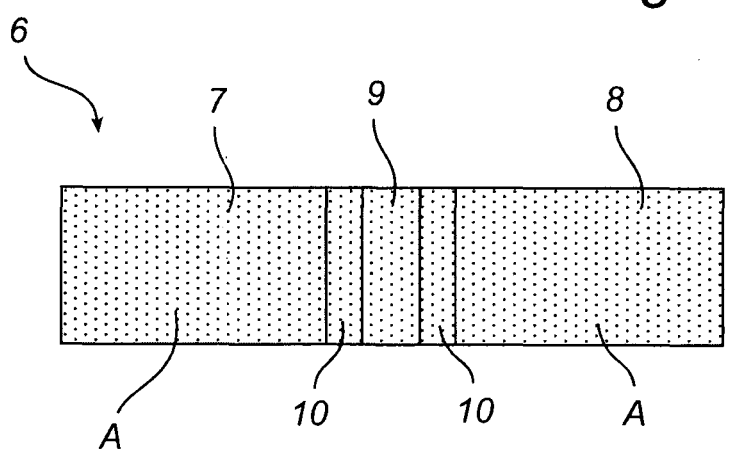
FIG. 3: A schematic view of a weld seam according to an embodiment of the invention.

In FIG. 3, a schematic view of a weld seam according to an embodiment of the invention, is shown. The first steel part 7 and the second steel part 8 of the steel component 6 are joined by the weld seam 9. A heat affected zone 10 is present adjacent the weld seam 9, and an unaffected zone A is adjacent the heat affected zone 10. In this embodiment, the first 7 and second 8 steel parts are made of the same steel and have an identical microstructure. However, in this embodiment, the steel component 6, in addition to the steps performed in the embodiment according to FIG. 2, is seen after the step of soft annealing 4 according to the method of the present invention. Consequently, the heat affected zone 10 and the weld seam 9 has an identical, or very similar, microstructure compared to the unaffected zone A of the first 7 and second 8 steel parts.

Figure 4A:
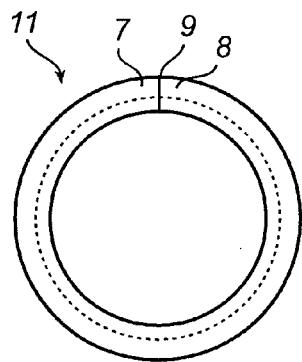
FIG. 4*a*: A schematic view of a welded steel component according to an embodiment of the invention.

In FIG. 4a, a schematic view of a welded steel component according to an embodiment of the invention is shown. In this embodiment, the steel component is a ring 11 that comprises a weld seam 9. The weld seam 9 joins the first 7 and the second 8 steel parts of the ring 11. The weld seam 9 is created by using the method according to the first aspect of the invention.

Figure 4B:
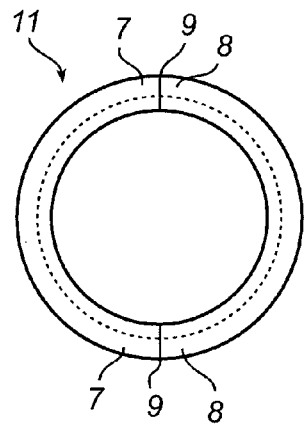
FIG. 4*b*: A schematic view of a welded steel component according to an embodiment of the invention.

In FIG. 4b, a schematic view of a welded steel component according to an embodiment of the invention is shown. In this embodiment, the steel component is a ring 11 that comprises two weld seams 9. The weld seams 9 joins the first 7 and the second 8 steel parts of the ring 11. The weld seams 9 are created by using the method according to the first aspect of the invention.

Figure 5:
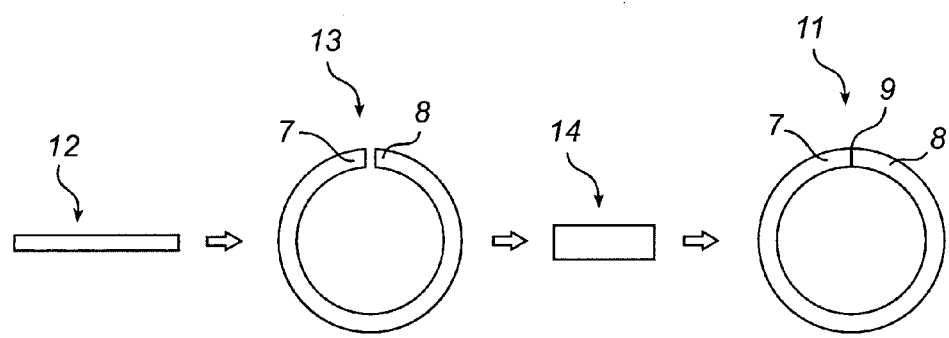
FIG. 5: A schematic view of a method for manufacturing a steel ring according to an embodiment of the invention.

In FIG. 5, a schematic view of a method for manufacturing a steel ring according to an embodiment of the invention is shown. In this embodiment, a wire 12 or a steel blank 12 is bent into a ring shaped element 13. The ring shaped element 13 has a first steel part 7 and a second steel part 8. In a following step 14, the first 7 and the second 8 steel parts of the ring shaped element 13 are joined by the weld seam 9, thus creating the steel ring 11. The weld seam 9 is created by using the method according to the first aspect of the invention.

Figure 6:
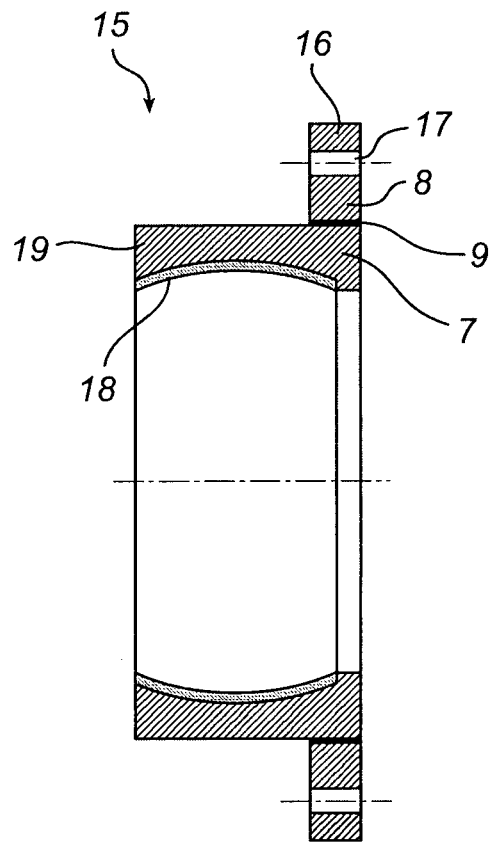
FIG. 6: A schematic view of a flanged bearing ring according to an embodiment of the invention.

In FIG. 6, a schematic view of a flanged bearing ring according to an embodiment of the invention is shown. The flanged bearing ring 15 comprises a steel ring 19 and flange 16. The flange further presents a plurality of holes that may be used to fasten the flange to another structure (not shown). The steel ring 19 has a raceway 18 that is meant to receive rolling elements, such as balls or rollers, or a sliding ring (not shown). The steel ring 11 further has a first steel part 7 and the flange 16 has a second steel part 8 that are joined by the weld seam 9. The weld seam 9 is created by using the method according to the first aspect of the invention. It should be pointed out that this embodiment is for illustrative purpose and the position of the weld seam may be else where in the welded component. Furthermore, other bearing components may comprise the weld seam according to the invention.

Figure 7:
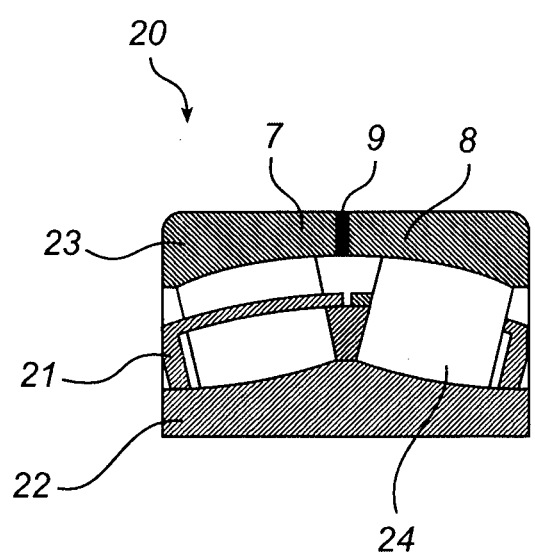
FIG. 7: A schematic view of a part of a rolling bearing with a bearing ring according to an embodiment of the invention.

In FIG. 7, a schematic view of a part of a rolling bearing with a bearing ring according to an embodiment of the invention is shown. In this embodiment, the rolling bearing 20 is a spherical roller bearing. It comprises an inner ring 22, an outer ring 23, a plurality of rollers 24 in two rows, and a cage 21 for holding the rollers 24 in place. The outer ring 23 has a first steel part 7 and a second steel part 8 that are joined by the weld seam 9. The weld seam 9 is created by using the method according to the first aspect of the invention. It should be pointed out that this embodiment is for illustrative purpose and the position of the weld seam may be else where in the welded component. Furthermore, other bearing components may comprise the weld seam according to the invention.

Figure 8A:
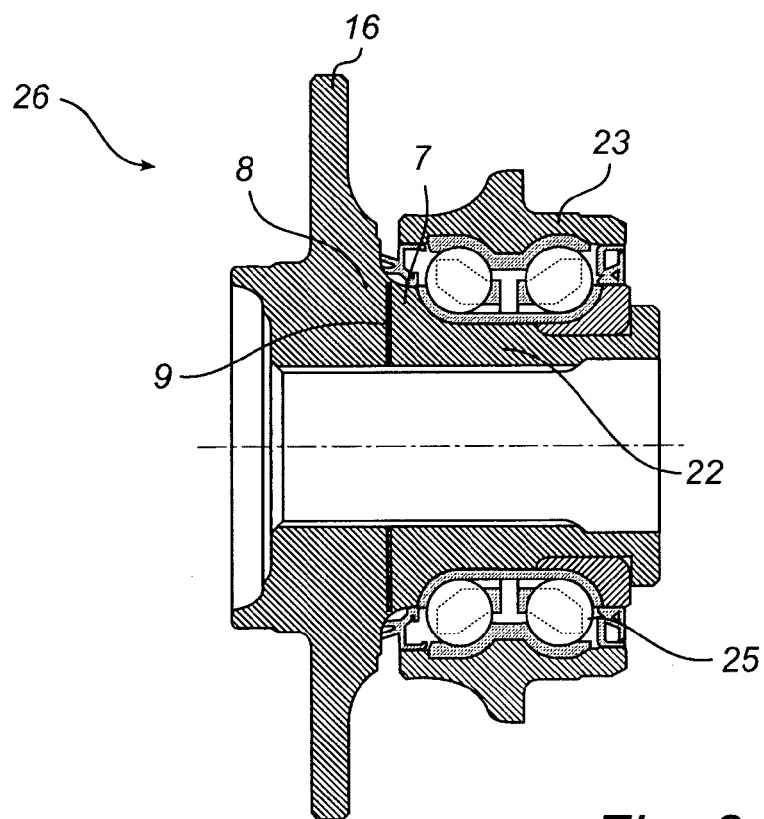
FIG. 8*a*: A schematic view of a wheel bearing unit according to an embodiment of the invention.

In FIG. 8a, a schematic view of a wheel bearing unit according to an embodiment of the invention is shown. The wheel bearing unit 26 comprises an inner ring 22, or a hub 22, an outer ring 23, and a plurality of balls 25 interposed in-between. The outer ring 23 may have a flange (not shown) for attaching the wheel bearing unit to a car-side fitting, e.g. a knuckle (not shown). The inner ring 22 has a first steel part 7. A flange 16 intended for fitting a wheel to the wheel bearing unit 26, has a second steel part 8. The first steel part 7 and the second steel part 8 are joined by the weld seam 9, according to the invention, thus joining the flange 16 to the inner ring 22 of the wheel bearing unit 26. The weld seam 9 is created by using the method according to the first aspect of the invention.

In this embodiment the rolling elements are balls, but it may also be tapered rollers or cylindrical rollers. The wheel bearing unit may also comprise further bearing components such as a cage, a seal, a sensor, an encoder, lubricants etc. It should also be understood that the invention is not limited to the wheel bearing unit as shown in FIG. 8a, but is also applicable to other wheel hub and wheel bearing designs. It should also be pointed out that this embodiment is for illustrative purpose and the position of the weld seam may be else where in the wheel bearing unit. Furthermore, other wheel bearing components may comprise the weld seam according to the invention.

Figure 8B:
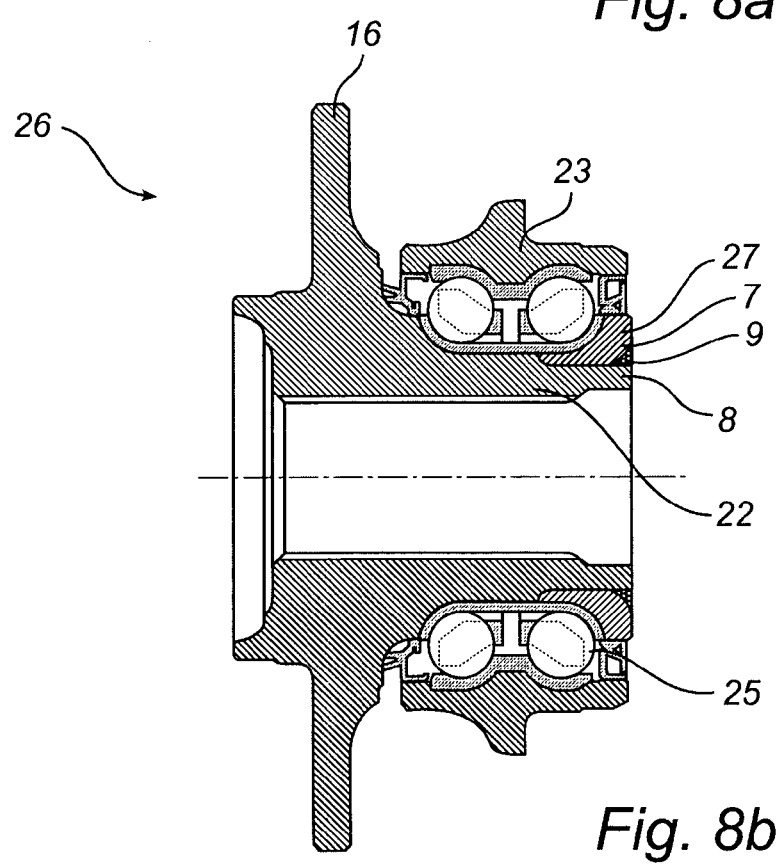
FIG. 8*b*: A schematic view of a wheel bearing unit according to an embodiment of the invention.

In FIG. 8b, a schematic view of a wheel bearing unit according to an embodiment of the invention is shown. The wheel bearing unit 26 comprises an inner ring 22, or a hub 22, an outer ring 23, and a plurality of balls 25. In this embodiment the wheel bearing unit further has a separate inner ring 27 that is press-fitted onto the inner ring 22. The separate inner ring 27 has a first steel part 7. The outer ring 23 may have a flange (not shown) for attaching the wheel bearing unit to a car-side fitting, e.g. a knuckle (not shown). The inner ring 22 has a flange 16 intended for fitting a wheel to the wheel bearing unit 26. The inner ring 22 further has a second steel part 8. The first steel part 7 and the second steel part 8 are joined by the weld seam 9, according the invention, thus joining the separate inner ring 27 to the inner ring 22 of the wheel bearing unit 26. The weld seam 9 is created by using the method according to the first aspect of the invention.

In this embodiment the rolling elements are balls, but it may also be tapered rollers or cylindrical rollers. The wheel bearing unit may also comprise further bearing components such as a cage, a seal, a sensor, an encoder, lubricants etc. It should also be understood that the invention is not limited to the wheel bearing unit as shown in FIG. 8b, but is also applicable to other wheel hub and wheel bearing designs. It should also be pointed out that this embodiment is for illustrative purpose and the position of the weld seam may be else where in the wheel bearing unit. Furthermore, other wheel bearing components may comprise the weld seam according to the invention It should be understood that in addition to these two embodiments of wheel bearing units, there are other parts or embodiments of such wheel bearing units where the manufacturing method, the weld, or the welded components according to the different aspects of the invention, are applicable.

In FIG. 9, a schematic view of a method for manufacturing a cage according to an embodiment of the invention is shown. In this embodiment, a steel strip has been rolled to a desired profile 28. In a subsequent step a plurality of pockets 30 is punched out. The resulting steel profile 29 is bent into a ring (not shown). The steel profile 29 has a first steel part 7 and a second steel part 8. In a following step 14, the first 7 and the second 8 steel parts of the steel profile are joined by the weld seam 9, thus creating the cage 31. The weld seam 9 is created by using the method according to the first aspect of the invention.

It should be understood that in addition to this embodiment of a cage, there are other possible embodiments where the manufacturing method, the weld, or the welded components according to the different aspects of the invention, are applicable. For instance, the pockets 30 may be created by welding pins or small steel strips to a larger punched out steel strip 29.

The invention claimed is:

1. A method for manufacturing a steel component comprising the steps of:
    providing a first steel part and a second steel part, the first and second steel parts each having a carbon content up to 1.5 percent by weight,
    heating at least a portion of the first steel part and at least a portion of the second steel part to a first temperature above an alpha/gamma transformation temperature of the first steel part, the second steel part, or both,
    after heating the first and second steel parts, joining the first steel part and the second steel part by welding the heated portions of the two steel parts to form the steel component, the welding taking place in an environment that is at a second temperature above the alpha/gamma transformation temperature, the second temperature being higher than the first temperature,
    cooling the heated portions of the two steel parts to the second temperature, after joining the first steel part and the second steel part; and
    cooling the heated portions of the two steel parts from the second temperature to below the alpha/gamma transformation temperature such that hardening of the component is avoided.

2. The method according to claim 1 further comprising the step of soft annealing the steel component.

3. The method according to claim 2 further comprising the step of hardening the steel component after the step of annealing the component.

4. The method according to claim 1, wherein the steel component is a bearing component.

5. The method of claim 1, wherein the first temperature ranges from approximately 750° C. to 850° C. and the second temperature is 860° C.

6. The method of claim 1, wherein cooling the heated portions of the steel component from the second temperature comprises increasing a cooling rate of the component after a surface region thereof has been transformed into pearlite.

* * * * *